US012344526B2

(12) United States Patent
O'Malley et al.

(10) Patent No.: US 12,344,526 B2
(45) Date of Patent: Jul. 1, 2025

(54) SYSTEM AND METHOD FOR SEPARATION OF SALTS AND CARBON ALLOTROPES

(71) Applicant: SkyNano LLC, Louisville, TN (US)

(72) Inventors: James O'Malley, Knoxville, TN (US); David L. Wood, III, Knoxville, TN (US); Anna E. Douglas, Knoxville, TN (US); Lucy Moore, Knoxville, TN (US)

(73) Assignee: SkyNano LLC, Louisville, TN (US)

( * ) Notice: Subject to any disclaimer, the term of this patent is extended or adjusted under 35 U.S.C. 154(b) by 126 days.

(21) Appl. No.: 18/504,240

(22) Filed: Nov. 8, 2023

(65) Prior Publication Data
US 2025/0145465 A1    May 8, 2025

(51) Int. Cl.
C01B 32/05 (2017.01)
C01B 32/17 (2017.01)
C01B 32/215 (2017.01)
C01B 32/28 (2017.01)
C01B 32/378 (2017.01)
C01D 15/08 (2006.01)
C09C 1/48 (2006.01)

(52) U.S. Cl.
CPC .............. *C01B 32/05* (2017.08); *C01B 32/17* (2017.08); *C01B 32/215* (2017.08); *C01B 32/28* (2017.08); *C01B 32/378* (2017.08); *C01D 15/08* (2013.01); *C09C 1/487* (2013.01)

(58) Field of Classification Search
CPC ....... C09C 1/487; C01B 32/17; C01B 32/215; C01B 32/28; C01B 32/378
See application file for complete search history.

(56) References Cited

U.S. PATENT DOCUMENTS

| 2,012,684 A | * | 8/1935 | Kennedy ............... C01B 32/215 |
| | | | 423/127 |
| 2022/0213822 A1 | | 7/2022 | Wang et al. |
| 2023/0287538 A1 | * | 9/2023 | Riebel ..................... C22B 23/00 |

FOREIGN PATENT DOCUMENTS

| CN | 101007239 A | 8/2007 |
| CN | 111517443 A | 8/2020 |
| WO | 2013111947 A1 | 8/2013 |

OTHER PUBLICATIONS

International Search Report and Written Opinion for application No. PCT/US2024/054730 dated Feb. 11, 2025.
Qiao et al., "Highly efficient and environmental-friendly separation and purification of carbon nanotubes from molten salt via ultrasound assisted carbonation", Separation and Purification Technology, 2023, vol. 306, pp. 1-9.

* cited by examiner

*Primary Examiner* — Stuart L Hendrickson
(74) *Attorney, Agent, or Firm* — DLA Piper LLP (US)

(57) ABSTRACT

The present disclosure describes a method of separating a carbon allotrope from a salt and a separation system for the same. The method may include adding a solid comprising the carbon allotrope and the salt to a solution comprising the salt, performing a first filtration on the solution at a first temperature to remove the carbon allotrope from the solution, adjusting the temperature of the solution to a second temperature to precipitate a first portion of the salt, performing a second filtration on the solution at the second temperature to remove the first portion of the salt from the solution, adjusting the temperature of the solution to the first temperature to dissolve a second portion of the salt in the solution, and recycling the solution.

23 Claims, 2 Drawing Sheets

SYSTEM AND METHOD FOR SEPARATION OF SALTS AND CARBON ALLOTROPES

GOVERNMENT INTEREST

This invention was made with government support under NSF SBIR Phase II Project No. 2132768 awarded by the National Science Foundation. The government has certain rights in the invention.

BACKGROUND

The concentration of carbon dioxide in the atmosphere is now about 420 parts per million, which is the highest concentration in history. Because of the relationship between atmospheric $CO_2$ and global warming, technologies that capture, store, or convert $CO_2$ are desirable. However, known processes are not only costly from the perspective of thermodynamic and electrochemical inputs, but they tend to produce materials which have little, if any, commercial value. There is a need for processes that not only capture and store $CO_2$ from the atmosphere, but also produce materials with appreciable commercial value. For example, processes that capture and store $CO_2$ from the atmosphere by forming carbon allotropes would be particularly desirable.

It is further necessary to purify the carbon allotropes produced by such methods. While methods of purifying carbon allotropes are known, there remains a need for separation methods which are capable of purifying carbon allotropes without producing additional carbon dioxide, while recovering the carbon capture materials to allow for a continuous carbon capture and separation process.

SUMMARY

In some aspects, the techniques described herein relate to a method of separating a carbon allotrope and a salt, including: adding a solid including the carbon allotrope and the salt to a solution including the salt, performing a first filtration on the solution at a first temperature to remove the carbon allotrope from the solution, adjusting the temperature of the solution to a second temperature to precipitate a first portion of the salt, performing a second filtration on the solution at the second temperature to remove the first portion of the salt from the solution, adjusting the temperature of the solution to the first temperature to dissolve a second portion of the salt in the solution, and recycling the solution.

In some aspects, the techniques described herein relate to a method, wherein the solid includes about 1 wt. % to about 50 wt. % of the carbon allotrope.

In some aspects, the techniques described herein relate to a method, wherein the carbon allotrope includes multi-walled carbon nanotubes, single-walled carbon nanotubes, carbon black, graphite, fullerene, or combinations thereof.

In some aspects, the techniques described herein relate to a method, wherein the salt includes lithium carbonate.

In some aspects, the techniques described herein relate to a method, wherein the first temperature is about 5° C. to about 25° C.

In some aspects, the techniques described herein relate to a method, wherein the second temperature is about 65° C. to about 90° C.

In some aspects, the techniques described herein relate to a method, wherein the difference between the first temperature and the second temperature is about 45° C. to about 85° C.

In some aspects, the techniques described herein relate to a method, wherein the first filtration and the second filtration include vacuum filtration, pressure filtration, gravity filtration, or combinations thereof.

In some aspects, the techniques described herein relate to a method, wherein the carbon allotrope is at least about 20% pure by mass after the first filtration.

In some aspects, the techniques described herein relate to a method, wherein the carbon allotrope is at least about 50% pure by mass after the first filtration.

In some aspects, the techniques described herein relate to a method, wherein the carbon allotrope is at least about 80% pure by mass after the first filtration.

In some aspects, the techniques described herein relate to a method, further including performing an additional purification on the carbon allotrope after the first filtration.

In some aspects, the techniques described herein relate to a method, wherein the carbon allotrope is at least about 95% pure by mass after the additional purification.

In some aspects, the techniques described herein relate to a method, wherein the solution includes water and has a pH of about 9 to about 13.

In some aspects, the techniques described herein relate to a method, wherein the method is repeated continuously.

In some aspects, the techniques described herein relate to a method of separating a carbon allotrope and a salt, including: adding a solid including the carbon allotrope and the salt to an aqueous solution, performing a first filtration on the aqueous solution at a first temperature to remove the carbon allotrope from the aqueous solution, adjusting the temperature of the aqueous solution to a second temperature to precipitate a first portion of the salt, performing a second filtration on the aqueous solution at the second temperature to remove the first portion of the salt from the aqueous solution, and adjusting the temperature of the aqueous solution to the first temperature to dissolve a second portion of the salt in the aqueous solution, thereby separating the carbon allotrope and the salt.

In some aspects, the techniques described herein relate to a method, wherein the solid includes about 1 wt. % to about 50 wt. % of the carbon allotrope.

In some aspects, the techniques described herein relate to a method, wherein the carbon allotrope includes multi-walled carbon nanotubes, single-walled carbon nanotubes, carbon black, graphite, fullerene, or combinations thereof.

In some aspects, the techniques described herein relate to a method, wherein the salt includes lithium carbonate.

In some aspects, the techniques described herein relate to a method, wherein the first temperature is about 5° C. to about 25° C.

In some aspects, the techniques described herein relate to a method, wherein the second temperature is about 65° C. to about 90° C.

In some aspects, the techniques described herein relate to a method, wherein the difference between the first temperature and the second temperature is about 45° C. to about 85° C.

In some aspects, the techniques described herein relate to a method, wherein the first filtration and the second filtration include vacuum filtration, pressure filtration, gravity filtration, or combinations thereof.

In some aspects, the techniques described herein relate to a separation system, including: a mixing tank, a first filtration system operably connected to the mixing tank, a first holding vessel operably connected to the first filtration system, a first heat exchanger operably connected to the first holding vessel, a second filtration system operably connected to the first heat exchanger, a second holding vessel operably connected to the second filtration system, and a second heat exchanger operably connected to the second holding vessel.

In some aspects, the techniques described herein relate to a separation system, wherein the second heat exchanger is operably connected to the mixing tank.

In some aspects, the techniques described herein relate to a separation system, wherein the separation system is configured to allow continuous flow of a fluid through the separation system.

In some aspects, the techniques described herein relate to a separation system, further including one or more pumps.

In some aspects, the techniques described herein relate to a separation system, wherein the first filtration system and the second filtration system each individually include a vacuum filtration system.

In some aspects, the techniques described herein relate to a separation system, further including a third heat exchanger.

In some aspects, the techniques described herein relate to a separation system, further including a fluid source.

In some aspects, the techniques described herein relate to a system, wherein the separation system is capable of producing at least about 150 g/day of a carbon allotrope when the mixing tank has a volume of about 25 L, the first holding tank has a volume of about 50 L, and the second holding tank has a volume of about 60 L.

BRIEF DESCRIPTION OF THE DRAWINGS

Aspects, features, benefits, and advantages of the embodiments described herein will be apparent with regard to the following description, appended claims, and accompanying drawings where:

DETAILED DESCRIPTION

Figure 1:
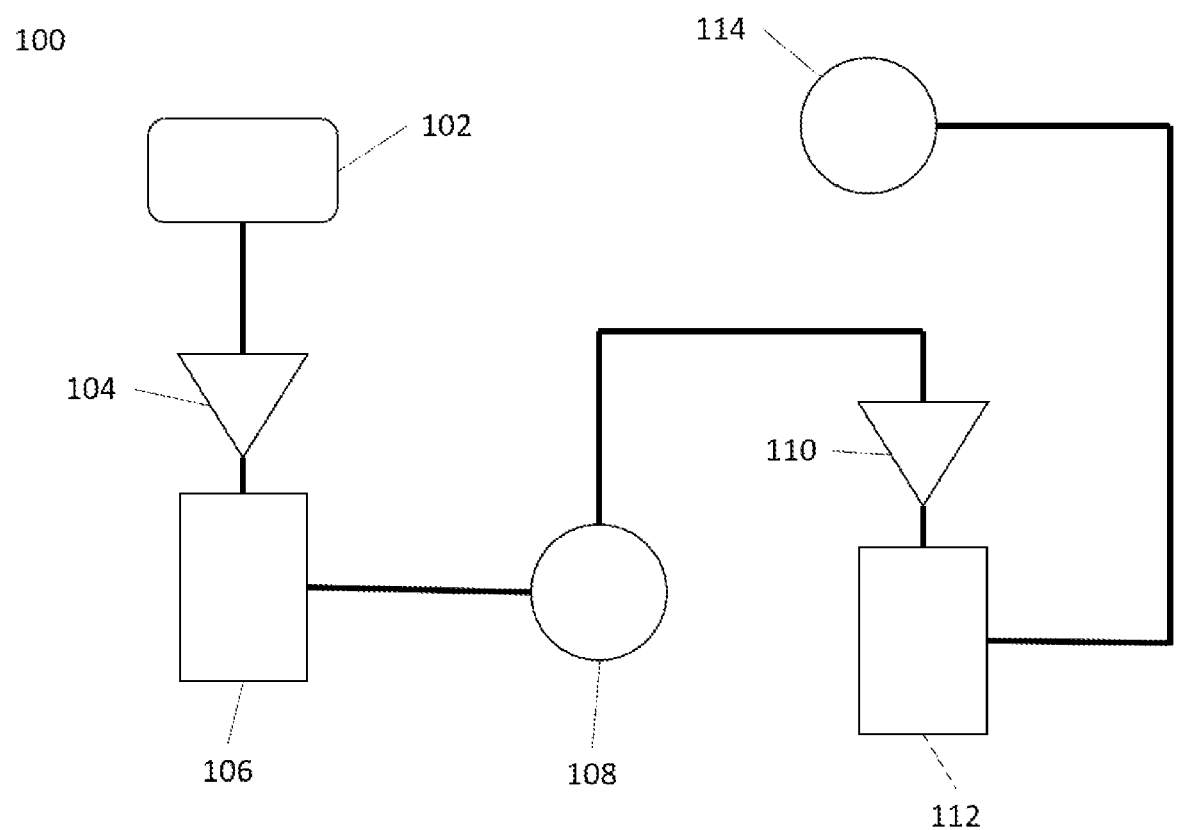
FIG. 1 is an illustrative diagram of the separation system of the present disclosure.

According to some embodiments of the present disclosure, there is provided a method of separating salts and carbon allotropes and a system for the same.

Before describing the embodiments in detail, the following definitions are used throughout the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45-55% and also includes exactly 50%.

In some embodiments, there is provided a method of separating a carbon allotrope and a salt, including steps of adding a solid including the carbon allotrope and the salt to a solution including the salt, performing a first filtration on the solution at a first temperature to remove the carbon allotrope from the solution, adjusting the temperature of the solution to a second temperature to precipitate a first portion of the salt, performing a second filtration on the solution at the second temperature to remove the first portion of the salt from the solution, adjusting the temperature of the solution to the first temperature to dissolve a second portion of the salt in the solution, and recycling the solution to repeat steps.

In some embodiments, the solid includes about 1 wt. % to about 50 wt. % of the carbon allotrope. For example, in some embodiments, the solid may include about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. % of the carbon allotrope, or any value contained within a range formed by any two of the preceding values.

In some embodiments, the carbon allotrope includes multi-walled carbon nanotubes, single-walled carbon nanotubes, carbon black, graphite, fullerene, or combinations thereof.

In some embodiments, the salt includes lithium carbonate, calcium carbonate, or combinations thereof. In some embodiments, the solution includes water. In some embodiments, the solution has a pH of about 6.0, about 6.5, about 7.0, about 7.5, about 8.0, about 8.5, about 9.0, about 9.5, about 10.0, about 10.5, about 11.0, about 11.5, about 12.5, about 13.0, or any value contained within a range formed by any two of the preceding values.

In some embodiments, the first temperature is about 5° C. to about 25° C. For example, in some embodiments, the first temperature may be about 5° C., about 10° C., about 15° C., about 20° C., about 25° C., or any value contained within a range formed by any two of the preceding values.

In some embodiments, the second temperature is about 65° C. to about 90° C. For example, in some embodiments, the second temperature may be about 65° C., about 70° C., about 75° C., about 80° C., about 85° C., or about 90° C., or any value contained within a range formed by any two of the preceding values.

In some embodiments, the difference between the first temperature and the second temperature is about 45° C. to about 85° C. For example, in some embodiments, the difference between the first temperature and the second temperature may be about 45° C., about 50° C., about 55° C., about 60° C., about 65° C., about 70° C., about 75° C., about 80° C., about 85° C., or any value contained within a range formed by any two of the preceding values. In some embodiments, the first temperature is between about 5° C. and about 25° C., and the second temperature is between about 65° C. and about 90° C. Any combination of the aforementioned temperatures, such that the difference between the first temperature and the second temperature is about 45° C. to about 85° C., is within the scope of the present disclosure.

In some embodiments, the first filtration and the second filtration each include vacuum filtration, pressure filtration, gravity filtration, or combinations thereof. Methods and equipment for performing these types of filtration will be understood by those of skill in the art and are not particularly limited. It is contemplated that the first filtration and the second filtration may be considered purification steps. Other filtration methods for separating solids and liquids may also be employed.

In some embodiments, the carbon allotrope is at least about 20% pure by mass after the first filtration, such as at least about 20%, at least about 50%, at least about 80%, at least about 85%, at least about 90%, at least about 95%, and so forth, or any value contained within a range formed by any two of the preceding values. Purity may be determined by any method available to those skilled in the art. In some embodiments, purity may be evaluated by obtaining a sample of the carbon allotrope which has undergone the first filtration, measuring the mass of the sample, washing the sample with a strong acid (which removes any residual salt from the sample), drying the sample, and measuring the mass of the sample after acid washing and drying. The mass difference between the sample before and after acid washing and drying will allow the determination of the amount of salt which was present in the carbon allotrope after the first filtration, which can be considered a measure of the purity of the carbon allotrope. In some embodiments, the carbon allotrope contains at most about 20 wt. % of the salt after the first filtration, such as about 20 wt. %, about 15 wt. %, about 10 wt. %, about 5 wt. %, about 1 wt. %, or any value contained within a range formed by two of the preceding values.

In some embodiments, the method further includes performing an additional purification on the carbon allotrope after the first filtration. The additional purification may include washing the carbon allotrope with water, an acidic solution, or combinations thereof, and filtering the carbon allotrope. The additional purification may, in some embodiments, be repeated a plurality of times.

In some embodiments, the carbon allotrope is at least about 95% pure by mass after the additional purification, such as at least about 95%, at least about 96%, at least about 97%, at least about 98%, at least about 99%, or about 100% pure by mass, or any value contained within a range formed by any two of the preceding values. In some embodiments, the carbon allotrope contains at most about 5 wt. % of the salt after the additional purification, such as about 5 wt. %, about 4 wt. %, about 3 wt. %, about 2 wt. %, about 1 wt. %, about 0 wt. %, or any value contained within a range formed by any two of the preceding values.

In some embodiments, the method includes recycling the solution, such that the method may be repeated continuously. The manner in which the solution is recycled is not particularly limited. The solution may, in some embodiments, be recycled and reused as is, without any purification or modification to the solution before reusing the solution in a future iteration of the present method. In some embodiments, the method can produce at least 150 g/day of the carbon allotrope having a purity of at least about 80% by mass from 3200 g of a mixture containing the carbon allotrope and the salt.

Performing the disclosed method steps in an order other than the order disclosed is contemplated, and within the scope of the disclosure. Other variations of the presently disclosed method may also be acceptable.

In some embodiments, there is provided a method of separating a carbon allotrope and a salt, including: adding a solid including the carbon allotrope and the salt to an aqueous solution, performing a first filtration on the aqueous solution at a first temperature to remove the carbon allotrope from the aqueous solution, adjusting the temperature of the aqueous solution to a second temperature to precipitate a first portion of the salt, performing a second filtration on the aqueous solution at the second temperature to remove the first portion of the salt from the aqueous solution, and adjusting the temperature of the aqueous solution to the first temperature to dissolve a second portion of the salt in the aqueous solution, thereby separating the carbon allotrope and the salt.

In some embodiments, the solid comprises about 1 wt. % to about 50 wt. % of the carbon allotrope. For example, in some embodiments, the solid may include about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. % of the carbon allotrope, or any value contained within a range formed by any two of the preceding values.

In some embodiments, the carbon allotrope comprises multi-walled carbon nanotubes, single-walled carbon nanotubes, carbon black, graphite, fullerene, or combinations thereof. In some embodiments, the salt includes lithium carbonate.

In some embodiments, the first temperature is about 5° C. to about 25° C. For example, in some embodiments, the first temperature may be about 5° C., about 10° C., about 15° C., about 20° C., about 25° C., or any value contained within a range formed by any two of the preceding values.

In some embodiments, the second temperature is about 65° C. to about 90° C. For example, in some embodiments, the second temperature may be about 65° C., about 70° C., about 75° C., about 80° C., about 85° C., or about 90° C., or any value contained within a range formed by any two of the preceding values.

In some embodiments, the difference between the first temperature and the second temperature is about 45° C. to about 85° C. For example, in some embodiments, the difference between the first temperature and the second temperature may be about 45° C., about 50° C., about 55° C., about 60° C., about 65° C., about 70° C., about 75° C., about 80° C., about 85° C., or any value contained within a range formed by any two of the preceding values. In some embodiments, the first temperature is between about 5° C. and about 25° C., and the second temperature is between about 65° C. and about 90° C. Any combination of the aforementioned temperatures, such that the difference between the first temperature and the second temperature is about 45° C. to about 85° C., is within the scope of the present disclosure.

In some embodiments, the first filtration and the second filtration each include vacuum filtration, pressure filtration, gravity filtration, or combinations thereof. Methods and equipment for performing these types of filtration will be understood by those of skill in the art and are not particularly limited. It is contemplated that the first filtration and the second filtration may be considered purification steps. Other filtration methods for separating solids and liquids may also be employed.

As described herein, in some embodiments, the carbon allotrope is at least about 20% pure by mass after the first filtration, such as at least about 20%, at least about 50%, at least about 80%, at least about 85%, at least about 90%, at least about 95%, and so forth, or any value contained within a range formed by any two of the preceding values.

In some embodiments, the method includes performing an additional purification on the carbon allotrope. The additional purification may include washing the carbon allotrope with water, an acidic solution, or combinations thereof, and filtering the carbon allotrope. The additional purification may, in some embodiments, be repeated a plurality of times. In some embodiments, the carbon allotrope is at least about 95% pure by mass after the additional purification, such as at least about 95%, at least about 96%, at least about 97%, at least about 98%, at least about 99%, or about 100% pure by mass, or any value contained within a range formed by any two of the preceding values.

In some embodiments, there is provided a separation system including a mixing tank, a first filtration system operably connected to the mixing tank, a first holding vessel operably connected to the first filtration system, a first heat exchanger operably connected to the first holding vessel, a second filtration system operably connected to the first heat exchanger, a second holding vessel operably connected to the second filtration system, and a second heat exchanger operably connected to the second holding vessel.

FIG. 1 is an illustrative diagram of a separation system according to an embodiment of the present disclosure. The separation system 100 may include a mixing tank 102, a first filtration system 104 operably connected to the mixing tank, a first holding vessel 106 operably connected to the first filtration system, a first heat exchanger 108 operably connected to the first holding vessel, a second filtration system 110 operably connected to the first heat exchanger, a second holding vessel 112 operably connected to the second filtration system, and a second heat exchanger 114 operably connected to the second holding vessel.

The volumes of the mixing tank 102, the first holding vessel 106, and the second holding vessel 112 are not particularly limited and may be adjusted depending upon the amount of carbon allotrope and salt to be separated. The flow rate of fluid through the separation system is similarly not limited and may be adjusted as needed.

In some embodiments, the second heat exchanger is further operably connected to the mixing tank, which may allow continuous operation of the separation system. In some embodiments, the separation system is configured to allow continuous flow of a fluid through the separation system; for example, in some embodiments, the operable connections between the components of the separation system are configured for the flow of a fluid.

In some embodiments, the separation system further includes a third heat exchanger. The third heat exchanger may, in some embodiments, be located between the first holding tank and the first heat exchanger.

In some embodiments, the separation system further includes one or more pumps. The type of pump is not particularly limited and any pump suitable for pumping a fluid is acceptable for use in the separation system of the present disclosure. In some embodiments, the separation system includes a first pump located between and operably connected to the first holding tank and the first heat exchanger. In some embodiments, the separation system further includes a second pump located between and operably connected to the second holding tank and the third heat exchanger, in embodiments wherein the separation system includes the third heat exchanger. In some embodiments, the separation system further includes a third pump located between and operably connected to the mixing tank and the first filtration system. In some embodiments, the separation system includes one or more of the pumps in the above described locations.

In some embodiments, the separation system includes a mixing tank, a first filtration system operably connected to the mixing tank, a first holding vessel operably connected to the first filtration system, a first pump operably connected to the first holding tank, a first heat exchanger operably connected to the first pump, a second heat exchanger operably connected to the first heat exchanger, a second filtration system operably connected to the second heat exchanger, a second holding vessel operably connected to the second filtration system, a second pump operably connected to the second holding tank and the first heat exchanger, and a third heat exchanger operably connected to the second heat exchanger.

In some embodiments, any of the heat exchangers may be a low temperature heat exchanger, such that the fluid containing the salt that enters the heat exchanger at a first temperature and leaves the heat exchanger at a second temperature which is lower than the first temperature. In some embodiments, any of the heat exchangers may be a high temperature heat exchanger, such that the fluid containing the salt enters the heat exchanger at a first temperature and leaves the heat exchanger at a second temperature which is higher than the first temperature. The difference between the temperature of the fluid that enters any of the heat exchangers and the temperature of the fluid that leaves any of the heat exchangers may be about 20° C. to about 50° C., such as about 20° C., about 25° C., about 30° C., about 35° C., about 40° C., about 45° C., about 50° C., or any value contained within a range formed by any two of the preceding values.

In some embodiments, the first filtration system and the second filtration system each individually include a vacuum filtration system. Other filtration systems which are suitable for solid-liquid filtration are also contemplated and within the scope of the present disclosure.

In some embodiments, the separation system further includes a fluid source. The fluid source may continuously or intermittently supply additional fluid to the separation system, as needed.

Figure 2:
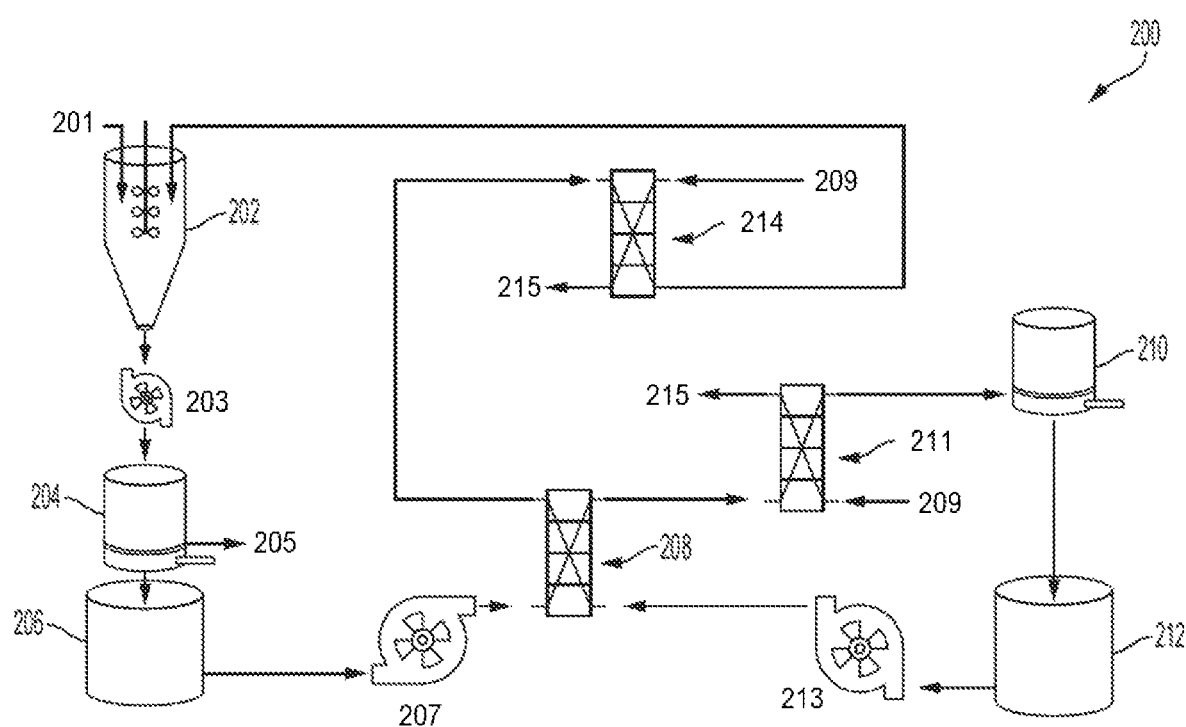
FIG. 2 is an illustrative diagram of a separation system having three pumps and three heat exchangers, according to an embodiment of the present disclosure.

FIG. 2 is an illustrative diagram of a separation system having three pumps and three heat exchangers, according to an embodiment of the present disclosure. The separation system 200 allows the input 201 of carbon allotrope and salt in solution into a mixing tank 202. A pump 203 may facilitate the transport of carbon allotrope and salt into a first filter 204. An initial portion of the carbon allotrope may be filtered off and isolated, 205. The remaining solution containing the salt may be collected in a first holding tank 206 before passing through a second pump 207. The solution may then pass through a first heat exchanger 208, wherein the solution may, in some embodiments, enter the first heat exchanger at a temperature of about 10° C. and leave the first heat exchanger at a temperature of about 45° C. The solution may pass through a second heat exchanger 214, wherein the solution may enter the second heat exchanger at a temperature of about 45° C. and leave the second heat exchanger at a temperature of about 80° C. It may be advantageous to use two heat exchangers sequentially as described herein, without wishing to be bound by theory. Additional fluid may enter 209 the second heat exchanger 211. The solution containing the salt may, after passing through the second heat exchanger, be filtered through a second filter 210, which may remove a portion of the salt from the solution. The solution may then be collected in a second holding tank 212, before passing through a third pump 213 to the second heat exchanger 208. The solution may, in some embodiments, enter the second heat exchanger at a temperature of about 80° C. and leave the second heat exchanger at a temperature of about 45° C. The solution may pass through a third heat exchanger 214. In some embodiments, the solution may enter the third heat exchanger at a temperature of about 40° C. and leave the third heat exchanger at a temperature of about 10° C. Additional fluid may enter 209 the third exchanger 214 as required. Fluid may be collected 215 from the second heat exchanger 208 or the third heat exchanger 214 as required.

In some embodiments, the separation system is capable of producing at least about 150 g/day of a carbon allotrope when the mixing tank has a volume of about 25 L, the first holding tank has a volume of about 50 L, and the second holding tank has a volume of about 60 L. It will be understood by skilled artisans that the separation system may be capable of higher or lower production rates based on the size of the separation system, the fluid flow rate, and the composition of the fluid that is provided to the separation system.

EXAMPLES

Example 1

A representative separation system was utilized according to the method described herein. FIG. 2 is an illustrative diagram of a separation system having three pumps and three heat exchangers, according to an embodiment of the present disclosure.

Using the separation system shown in FIG. 2, with a mixing tank having a volume of about 25 L and the holding tanks 1 and 2 having a volume of about 50 L and about 60 L, respectively, it is possible to obtain about 160 g/day of the purified carbon allotrope and about 3 kg/day of separated salt at a salt concentration of about 3.5 g/L of fluid to about 6.8 g/L of fluid. The representative input and output temperatures of the heat exchangers shown in FIG. 2 are non-limiting and may be adjusted as necessary. Without wishing to be bound by theory, the salt recovery performance of the separation system may also be related the magnitude of the temperature difference utilized. For example, with the temperature swing of about 10° C. to about 80° C. shown in FIG. 2, the salt recovery performance of the separation system may be about 5 g of salt recovered per liter of solution flowed.

This disclosure is not limited to the particular systems, devices and methods described, as these may vary. The terminology used in the description is for the purpose of describing the particular versions or embodiments only and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 compounds refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A method of separating a carbon allotrope and a salt, comprising:
    adding a solid comprising the carbon allotrope and the salt to a solution comprising the salt,
    performing a first filtration on the solution at a first temperature to remove the carbon allotrope from the solution,
    adjusting the temperature of the solution to a second temperature to precipitate a first portion of the salt,
    performing a second filtration on the solution at the second temperature to remove the first portion of the salt from the solution,
    adjusting the temperature of the solution to the first temperature to dissolve a second portion of the salt in the solution, and
    recycling the solution.

2. The method of claim 1, wherein the solid comprises about 1 wt. % to about 50 wt. % of the carbon allotrope.

3. The method of claim 1, wherein the carbon allotrope comprises multi-walled carbon nanotubes, single-walled carbon nanotubes, carbon black, graphite, fullerene, or combinations thereof.

4. The method of claim 1, wherein the salt includes lithium carbonate.

5. The method of claim 1, wherein the first temperature is about 5° C. to about 25° C.

6. The method of claim 1, wherein the second temperature is about 65° C. to about 90° C.

7. The method of claim 1, wherein the difference between the first temperature and the second temperature is about 45° C. to about 85° C.

8. The method of claim 1, wherein the first filtration and the second filtration comprise vacuum filtration, pressure filtration, gravity filtration, or combinations thereof.

9. The method of claim 1, wherein the carbon allotrope is at least about 20% pure by mass after the first filtration.

10. The method of claim 1, wherein the carbon allotrope is at least about 50% pure by mass after the first filtration.

11. The method of claim 1, wherein the carbon allotrope is at least about 80% pure by mass after the first filtration.

12. The method of claim 1, further comprising performing an additional purification on the carbon allotrope after the first filtration.

13. The method of claim 12, wherein the carbon allotrope is at least about 95% pure by mass after the additional purification.

14. The method of claim 1, wherein the solution comprises water and has a pH of about 9 to about 13.

15. The method of claim 1, wherein the method is repeated continuously.

16. A method of separating a carbon allotrope and a salt, comprising:
    adding a solid comprising the carbon allotrope and the salt to an aqueous solution,
    performing a first filtration on the aqueous solution at a first temperature to remove the carbon allotrope from the aqueous solution,
    adjusting the temperature of the aqueous solution to a second temperature to precipitate a first portion of the salt,
    performing a second filtration on the aqueous solution at the second temperature to remove the first portion of the salt from the aqueous solution, and
    adjusting the temperature of the aqueous solution to the first temperature to dissolve a second portion of the salt in the aqueous solution,
    thereby separating the carbon allotrope and the salt.

17. The method of claim 16, wherein the solid comprises about 1 wt. % to about 50 wt. % of the carbon allotrope.

18. The method of claim 16, wherein the carbon allotrope comprises multi-walled carbon nanotubes, single-walled carbon nanotubes, carbon black, graphite, fullerene, or combinations thereof.

19. The method of claim 16, wherein the salt includes lithium carbonate.

20. The method of claim 16, wherein the first temperature is about 5° C. to about 25° C.

21. The method of claim 16, wherein the second temperature is about 65° C. to about 90° C.

22. The method of claim 16, wherein the difference between the first temperature and the second temperature is about 45° C. to about 85° C.

23. The method of claim 16, wherein the first filtration and the second filtration comprise vacuum filtration, pressure filtration, gravity filtration, or combinations thereof.

* * * * *